United States Patent Office 2,732,266
Patented Jan. 24, 1956

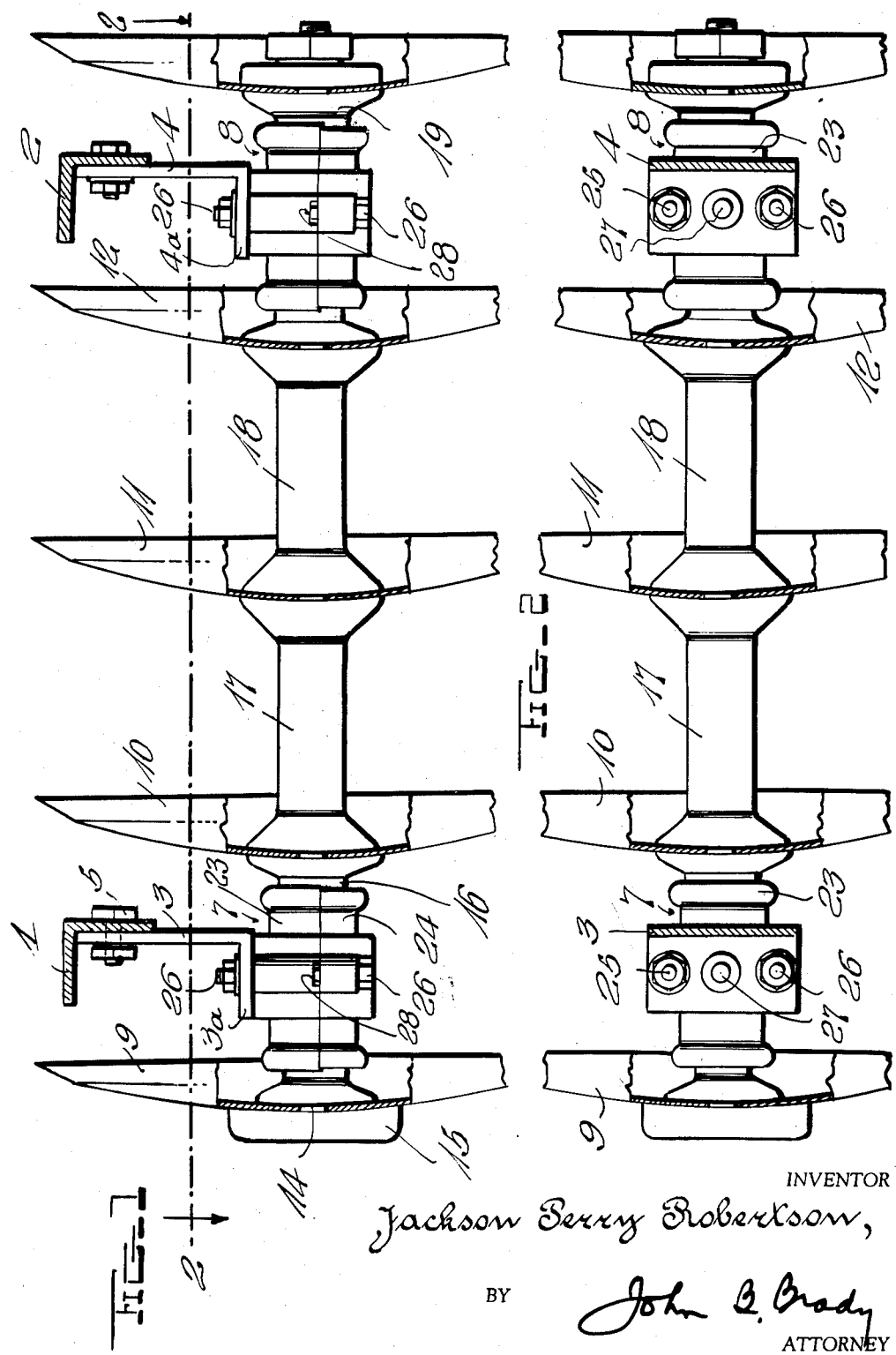

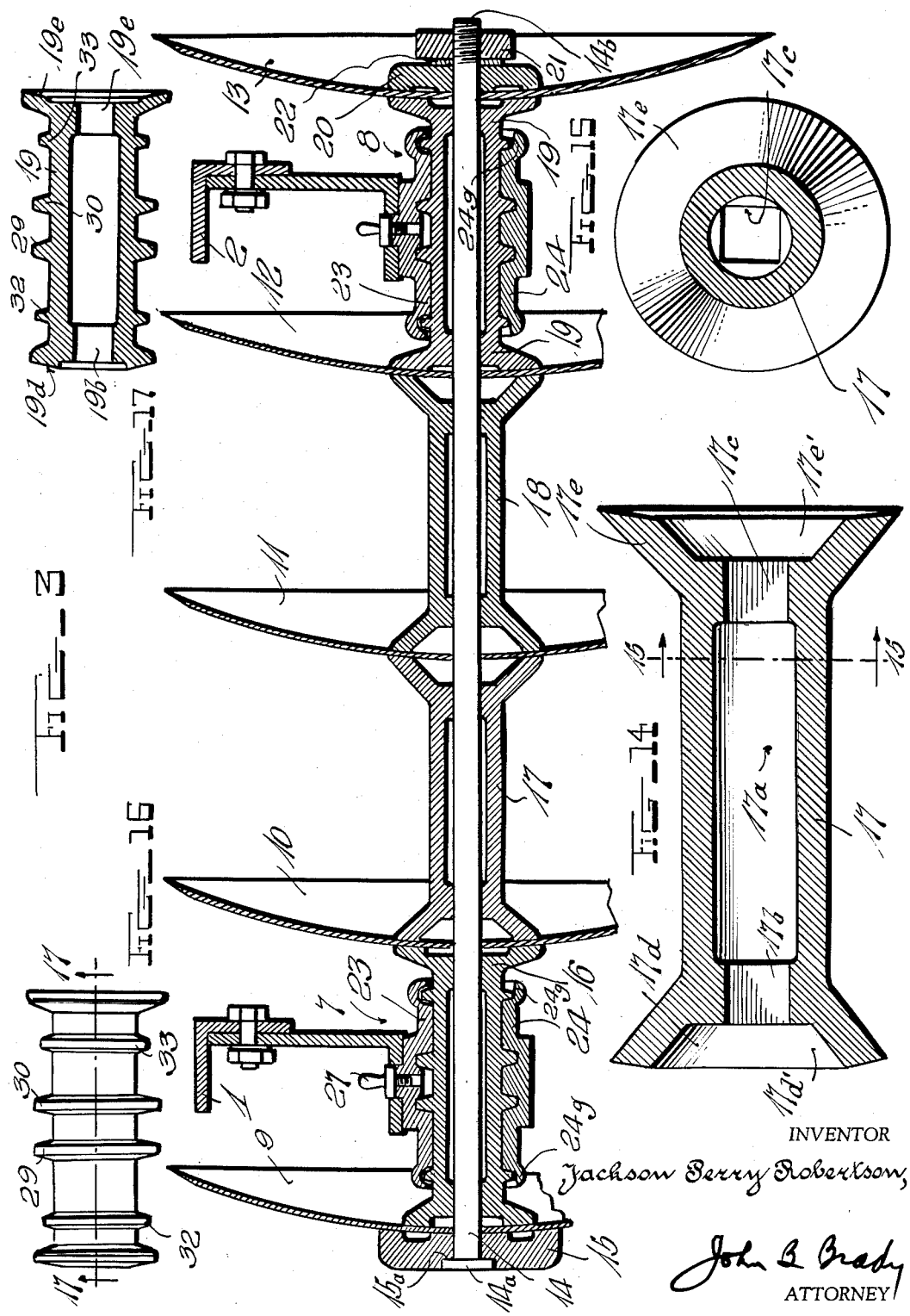

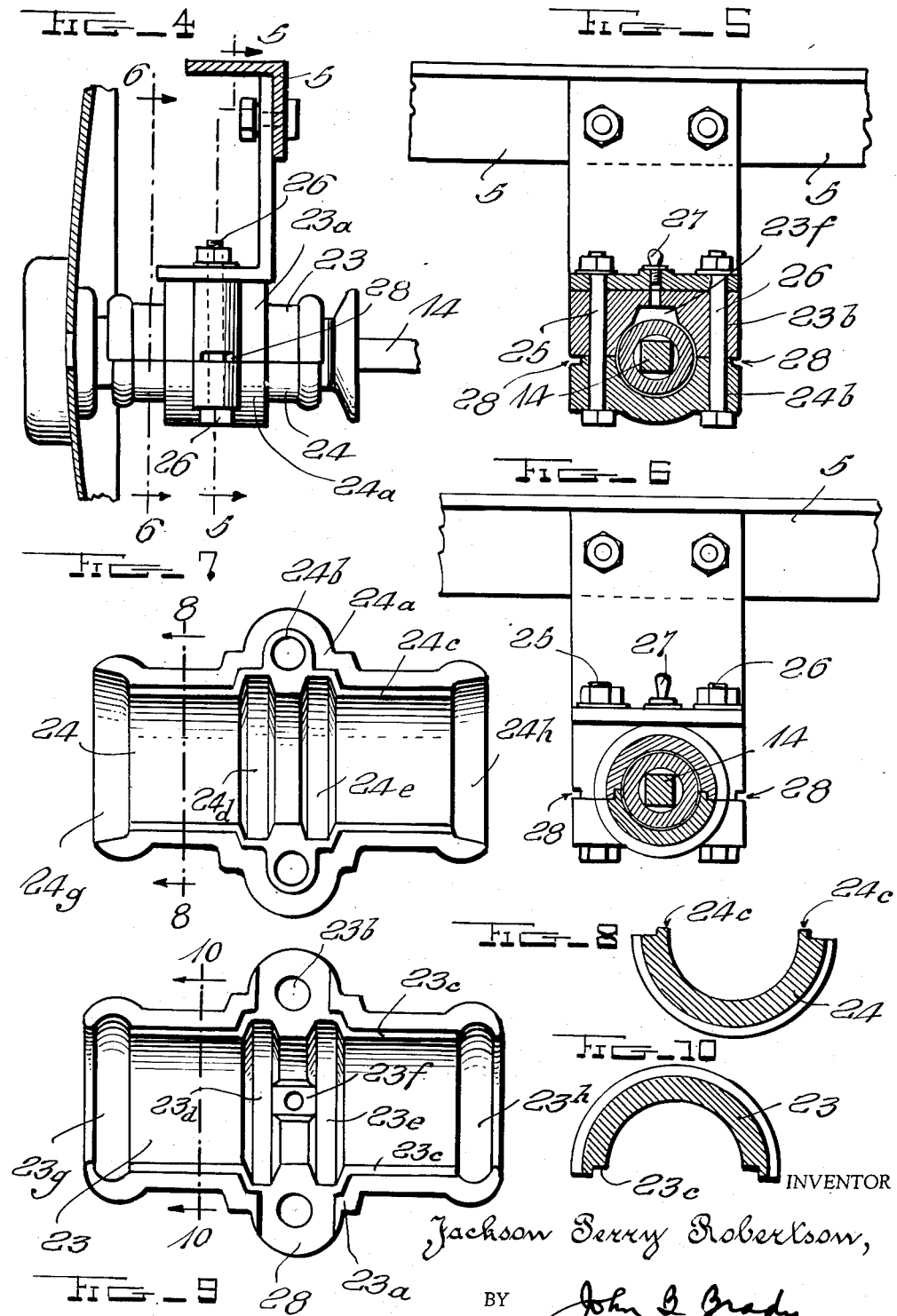

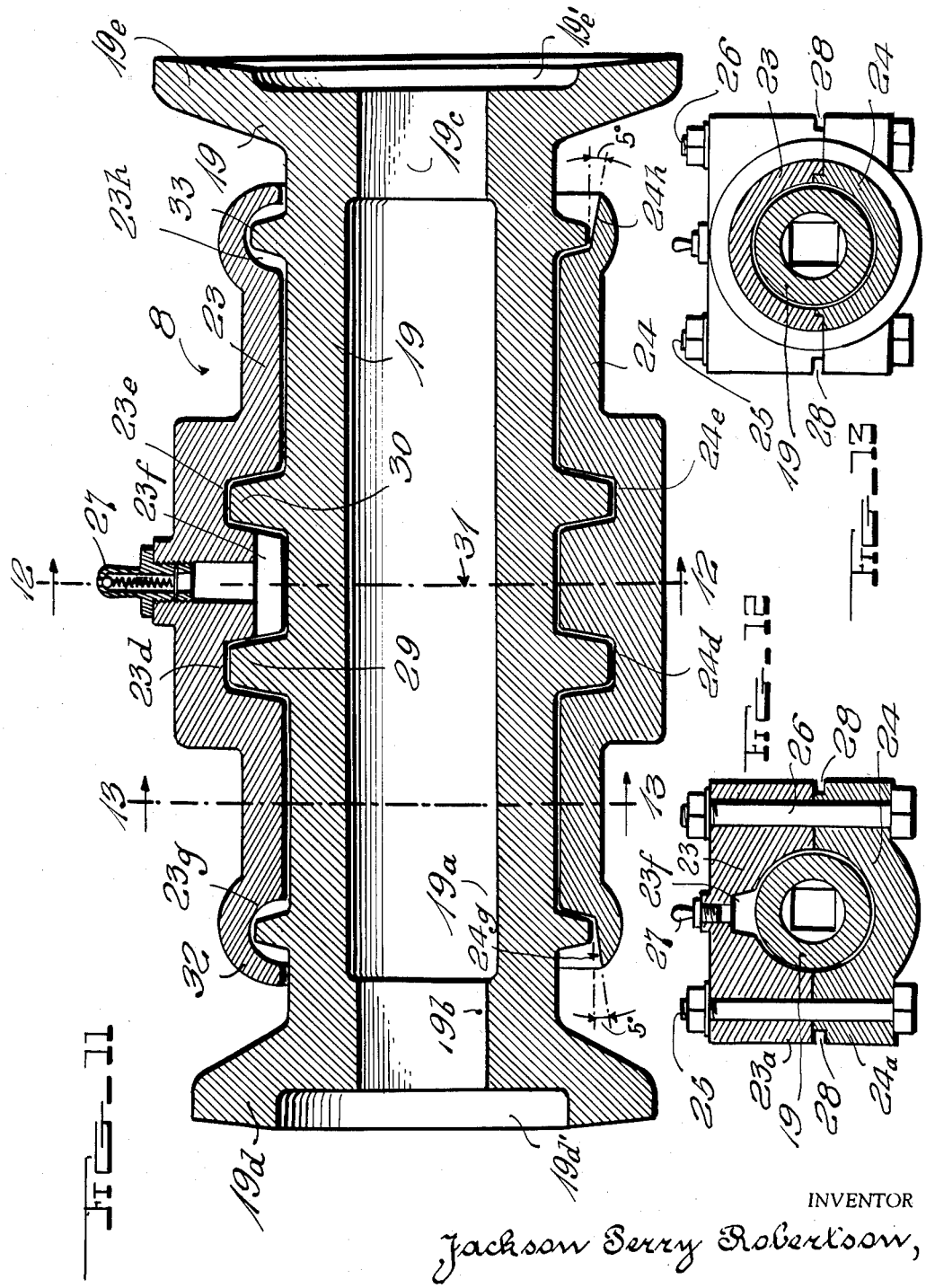

2,732,266
BEARING CONSTRUCTION FOR ROTATABLE DISC HARROWS

Jackson Perry Robertson, Columbus, Miss.

Application January 16, 1953, Serial No. 331,677

8 Claims. (Cl. 308—19)

My invention relates broadly to multiple lift type disc harrows and more particularly to bearing constructions for the disc gangs for such harrows.

This application is a continuation-in-part of my applications serially numbered 35,805, filed June 29, 1948, now Patent No. 2,646,657, dated July 28, 1953, for Multiple Lift Type Disc Harrow, and 162,764, filed May 18, 1950, now Patent No. 2,640,307, dated June 2, 1953, for Multiple Lift Type Disc Harrow.

One of the objects of my invention is to provide a construction of bearing for mounting the disc gangs in harrows and providing for the rotation of such discs during the harrowing operations with provision for lubricating the bearings and obstructing entry of dirt and extraneous matter into the bearing.

Still another object of my invention is to provide an improved construction of sleeve bearing for mounting gangs of discs in multiple-disc harrows in which a bearing sleeve and coacting housing are provided with centrally positioned, relatively closely spaced bearing flanges and coacting grooves serving to obstruct the leakage of lubricant out of the bearing and having more widely spaced flanges and coacting grooves adjacent the terminating ends thereof for preventing entry of dirt and extraneous matter into the bearing, where said housing serves as a support for the bearing and has a suspension for the gang of discs from the harrow frame and in which said bearing sleeve also serves as a spacing means for adjacent discs of the harrow.

Still another object of my invention is to provide a composite construction of bearing for multiple rotatable disc harrows which includes a bearing sleeve forming a spacing member between adjacent discs and provided with sets of annular flanges thereon adapted to coact with correspondingly formed grooves on a supporting housing which forms a catch basin for lubricant supplied through the top of the housing intermediate the annular flanges.

Other and further objects of my invention reside in the construction of bearing and the mounting means therefor, as set forth more fully in the specification hereinafter following by reference to the accompanying drawings, in which:

Figure 1 is an elevational view of a multiple disc harrow gang journaled with respect to a harrow frame in accordance with my invention, central portions of the gangs being broken away and illustrated in section to more clearly illustrate the mounting thereon; Fig. 2 is a horizontal sectional view taken on line 2—2 of Fig. 1 and showing the central portions of the gangs broken away as in Fig. 1; Fig. 3 is a longitudinal sectional view taken through a multiple gang of rotatable discs journaled in accordance with my invention; Fig. 4 is an elevational view of the journaling means at one end of the multiple disc harrow; Fig. 5 is a vertical sectional view taken on line 5—5 of Fig. 4; Fig. 6 is a vertical sectional view taken on line 6—6 of Fig. 4; Fig. 7 is a plan view looking into the interior of one of the lower housings, of the journaling means for the multiple gang rotatable disc assembly embodying my invention; Fig. 8 is a transverse sectional view on line 8—8 of Fig. 7; Fig. 9 is a plan view looking into the interior of one of the upper housings forming part of the journaling means of my invention; Fig. 10 is a vertical sectional view taken on line 10—10 of Fig. 9; Fig. 11 is a longitudinal sectional view on an enlarged scale taken through the bearing and the journaling means of my invention and illustrating the manner in which the parts of the cylindrical bearing sleeve and spacer member coact with the parts of the housing; Fig. 12 is a transverse vertical sectional view taken substantially on line 12—12 of Fig. 11; Fig. 13 is a transverse vertical sectional view taken on line 13—13 of Fig. 11; Fig. 14 is a longitudinal cross-sectional view taken through one of the spacer members provided between the intermediate discs of the multiple gang rotatable disc assembly of my invention; Fig. 15 is a vertical transverse sectional view taken on line 15—15 of Fig. 14; Fig. 16 is an elevational view of the sleeve bearing employed in the journal of my invention; and Fig. 17 is a longitudinal sectional view through the sleeve bearing taken on line 17—17 of Fig. 16.

My invention is directed to a construction of multiple gang rotatable disc assembly for harrows and particularly the bearing structure for rotatably journaling the harrow discs with respect to the harrow frame. I provide a rotatable gang disc assembly comprising a horizontally extending through-bolt supporting the harrow discs thereon spaced one from another through spacing members, certain ones of which are supported on the harrow frame and form journaling means for the gang disc assembly permitting rotation of the discs as the harrow operates over the ground. The bearing construction forming the journaling means for the gang disc assembly is a particular feature of my invention. I provide a generally cylindrical housing which is laterally divided in a substantially horizontal plane so that the housing is divided into two generally semi-cylindrical portions. The two portions of the housing are cast with a central portion projecting laterally and provided with aligned lugs through which fastening bolts extend for securing the housing in assembled relation with respect to a supporting bracket depending from the frame of the harrow. The enlarged central portion of the two parts of the housing are provided with internal relatively closely spaced aligned grooves which are laterally cross-connected at the top thereof in the upper section of the housing for the flow of lubricant into both grooves from a lubricant supply provided through the central portion of the supporting bracket on which the bearing housing is mounted. Special precaution is taken for casting a mating projection on the lower portion of the bearing housing which enters a complementary groove in the upper bearing portion. The lower portion of the bearing thus serves as a catch basin for the lubricant through which flanges carried by the spacer sleeve, which extends between the discs, project. These flanges revolve within the lubricant in the spaced grooves and support the weight of the revolvable disc gang assembly. The spacer sleeve is also provided with more widely spaced flanges adjacent opposite ends thereof and which fit into correspondingly formed grooves in the ends of both semi-cylindrical parts of the housing forming means for retaining the lubricant between rotatable spacer member and the two semi-cylindrical parts of the housing, and at the same time preventing entry of dirt into the bearing. The position of the flanges on the spacer sleeve is important in order to insure a symmetrically balanced mounting for the spacer member between the discs while providing adequate bearing surface between the spacer member and the housing and insuring continued lubrication while obstructing entry of dirt into the bearing.

Referring to the drawings in more detail, reference characters 1 and 2 designate frame members of a harrow which supports the multiple gang rotatable disc assembly of my invention. Brackets 3 and 4 depend from the frame members 1 and 2, respectively, and terminate in horizontally extending flanges 3a and 4a. The upper ends of the brackets 3 and 4 are fastened to the frame members 1 and 2 by bolt members 5 and 6. The flanges 3a and 4a serve as supporting means for the journal assemblies shown generally at 7 and 8 which rotatably mount the disc gang assembly comprising discs 9, 10, 11, 12 and 13.

The disc gang assembly includes the longitudinally extending through-bolt 14 having a head 14a on one end and extending axially through the header 15 and countersunk in the recess 15a thereof and extending through disc 9, spacer member 16, disc 10, spacer member 17, disc 11, spacer member 18, disc 12, spacer member 19, disc 13 and end plate 20 where it is engaged by fastening nut 21 engaging the screw-threaded end 14b of the through-bolt 14 and binding against washer 22. The rotatable disc gang is supported in the journal assemblies 7 and 8 by means of the upper and lower semi-cylindrical bearing housings represented at 23 and 24, respectively. Inasmuch as spacer members 16 and 19 constituting parts of the journaling means for the rotatable disc gang assembly and the associated journal assemblies 7 and 8 are identical in construction, the unit 8 will be described in detail and similar reference characters applied to the corresponding parts for both journal assemblies.

The upper and lower bearing housings 23 and 24 are shown in Figs. 9—10 and 7—8, respectively. These bearing housings have centrally aligned projections represented at 23a and 24a which contain aligned apertures 23b and 24b therein for the passage of securing bolts 25 and 26 which project through the horizontally extending flanges 3a and 4a of brackets 3 and 4 and secure the journal in position. The upper and lower bearing housings 23 and 24 are provided with a peripheral recess 23c and a peripheral extension 24c, respectively, which are shaped to engage each other and confine lubricant within the journal housing. The upper and lower bearing housings 23 and 24 are provided with internal grooves, one set of which are closely spaced on opposite sides of the suspension plane for the bearing housing as represented at 23d and 23e in the upper bearing housing and by the aligned grooves 24d and 24e in the lower bearing housing. The grooves are tapered and have flat sides terminating in a flat semi-cylindrical internal surface. The grooves 23d and 23e are interconnected by an axially aligned internal longitudinally extending recess 23f interconnecting the closely spaced grooves 23d and 23e for the feeding of lubricant from the upper portion of the upper bearing housing 23 through the lubricating port and feeder attachment represented at 27. Thus the closely spaced grooves 23d and 23e and the aligned counterparts 24d and 24e are continuously supplied with lubricant which is confined within the bearing housing by the interfitting peripheral projection 24c and recess 23c in the lower and upper bearing housings 24 and 23, respectively. The peripheral projection 24c around the bolt apertures 24b serve as spacer members for the upper and lower bearing housings and provide slots 28 into which a tool may be inserted for prying the parts of the bearing housing apart when a replacement spacer member or replacement gang must be installed.

The upper and lower bearing housings 23 and 24 are also provided with a pair of more widely spaced grooves adjacent opposite ends thereof and represented in Fig. 9 at 23g and 23h, respectively, and in Fig. 7 at 24g and 24h, respectively. The grooves 23g and 23h are semi-circular when viewed in longitudinal section as represented in Figs. 9 and 11. The grooves 24g and 24h are relatively flat and are flared outwardly and slanted downwardly approximately 5 degrees with respect to the horizontal, as represented more clearly in Fig. 11, for permitting the escape of excessive and used lubricants, at the same time forcing out any dust that may collect around the lower bearing housing 24. The upper bearing housing 23 has the end grooves 23g and 23h so protected against the entry of dirt and the escape of lubricant that the cylindrical sleeve forming the spacing member and the journal shown at 19 in Fig. 11 revolve in a continuously lubricated condition. The combined spacer member and journal represented at 19 is a casting having a hollow bore 19a extending therethrough and terminating in polygonal sections 19b and 19c adjacent the opposite ends thereof conforming in section with the cross-section of the through-bolt 14 whereby the spacer member 19 is keyed to the through-bolt 14 and revolves as a unit therewith. In the form of my invention illustrated, the through-bolt 14 and the end sections 19b and 19c are square and serve as keys interconnecting the through-bolt 14 and the spacer member 19. The opposite ends of the spacer member 19 are provided with radially extending circular flanges 19d and 19e centrally recessed as represented at 19d' and 19e'. The end flanges 19d and 19e terminate in annular faces which conform in shape to the harrow discs represented, for example, at 12 and 13 positively bracing the discs in position as part of the rotatable unit.

The exterior of the spacer member 19 is provided with a pair of closely spaced flanges represented at 29 and 30 which project on opposite sides of the medial plane represented by center line 31 into the grooves 23d and 23e in upper bearing housing 23 and at 24d and 24e in lower bearing housing 24. The flanges 29 and 30 taper at the sides thereof and terminate in flat peripheral faces which snugly engage the tapered side walls and the flat annular faces of the grooves 24d—24e and 23d—23e as shown. Thus lubricant is supplied from feeder 27 through the longitudinally extending passage 23f to the flanges 29 and 30 insuring continuous lubrication. In order to retain a film of lubricant between the upper and lower bearing housings 23 and 24 and the cylindrical surface of spacer member 19, the spacer member 19 is provided with annular flanges 32 and 33 adjacent opposite ends thereof and which fit into the aligned grooves 23g in upper bearing housing 23 and 24g in lower bearing housing 24 and into groove 23h in upper bearing housing 23 and into groove 24h in lower bearing housing 24. Because of the snug engagement between the flanges 32 and 33 and the coacting grooves, lubricant is retained while dirt is excluded from entering the journal, and as heretofore pointed out, excessive and used lubricants are permitted to escape through the downwardly extending lips of grooves 24g and 24h. The sliding contact provided between the side walls of the grooves and the side faces of the flanges and annular edge faces of the flanges insures a balanced and reliable operation of the journal.

As heretofore pointed out, the spacer members 16 and 17 which form composite housings and journal lubrication means are located adjacent opposite ends of the disc gang assembly while a modified arrangement of spacer member is provided intermediate the pairs of harrow discs as shown more clearly in Figs. 14 and 15 where spacer member 17, for example, has a hollow interior bore 17a for the passage of the through-bolt 14 and internal polygonal-shaped sections 17b and 17c corresponding to the section of the through-bolt 14 for insuring the rotation of the spacer member 17, the discs 10 and 11 and the through-bolt 14 as a unit. Spacer member 17 terminates in frusto-conical end portions 17d and 17e recessed at 17d' and 17e' whereby the inner face of disc 10 and the outer face of disc 11 are rigidly gripped so that the discs revolve with the through-bolt 14 and the spacer member 17 as a unit. A similar construction is provided for spacer member 18.

It will be noted that the structure of the spacer members 16 and 19 is such that the centrally located flanges 29 and 30 extend radially a greater distance than the remotely spaced flanges 32 and 33. This enables flanges 29 and 30 to serve as rotatable journaling means; whereas, flanges 32 and 33 serve as confining means for restricting the flow of lubricant and preventing the entry of dirt into the journal. The journal construction of my invention has proved very practical and efficient in use, and while I have described my invention in certain of its preferred embodiments, I realize that modifications may be made, and I desire that it be understood that no limitations upon my invention are intended other than may be imposed by the scope of the appended claims.

What I claim as new and desire to secure by Letters Patent of the United States is as follows:

1. Supporting means for disc-type harrows, comprising a substantially cylindrical sleeve forming a spacer member for the discs of a disc gang assembly, said spacer member having a pair of centrally arranged relatively closely spaced flanges thereon and a pair of more widely spaced flanges, one of said last-mentioned flanges being arranged adjacent one end of said spacer member and the other of said last-mentioned flanges being disposed adjacent the other end of said spacer member, a housing comprising a pair of substantially semi-cylindrical upper and lower portions, said portions being alignable with respect to each other above and below said spacer member and having internal grooves therein aligned with the flanges on said spacer member, unitary means for suspending said substantially semi-cylindrical upper and lower portions of said housing and simultaneously maintaining the said portions in confined relation to said spacer member and means for introducing lubricant through the upper portion of said housing in a position intermediate the grooves therein, the lower portion of said housing serving as a catch basin for lubricant into which the centrally arranged flanges on said spacer member extend as the disc gang revolves, said more widely spaced flanges on said spacer member and the coacting grooves in the portions of said housing coacting to obstruct leakage of lubricant from said housing and to prevent entry of dirt thereto.

2. Supporting means for disc-type harrows, as set forth in claim 1, in which the lower portion of said housing is provided at the opposite ends thereof with a downwardly inclined peripheral projection thereon and in which the upper portion of said housing is provided with a peripheral groove of substantially semi-circular section, said projection in said groove coacting to respectively seal said housing against leakage of lubricant and entry of dirt.

3. Supporting means for disc-type harrows, as set forth in claim 1, in which the upper portion of said housing is provided with laterally disposed internal longitudinally extending recess interconnecting said centrally arranged relatively closely spaced grooves for the feeding of lubricant from the upper portion of the said housing to both of said centrally arranged relatively closely spaced grooves.

4. Supporting means for disc-type harrows, as set forth in claim 1, in which the means for suspending said substantially semi-cylindrical upper and lower portions of said housing comprises a pair of suspension bolts which pass through both said upper and lower portions of said housing and through a supporting bracket said bolts being disposed in a plane which extends intermediate said two more closely spaced flanges on said spacer member.

5. Supporting means for disc-type harrows, as set forth in claim 1, in which the centrally arranged relatively closely spaced flanges on said spacer member project radially from said spacer member for a greater distance than the radial projection of the flange adjacent each end of the spacer member for accumulating a mass of lubricant between said centrally arranged relatively closely spaced flanges for distribution to the flanges adjacent the opposite ends of said spacer member.

6. Supporting means for disc-type harrows, as set forth in claim 1, in which the upper substantially semi-cylindrical portion of said housing has the coacting grooves adjacent the ends thereof formed on internal contours whose cross sections which are substantially semi-circular while the centrally arranged relatively closely spaced coacting grooves adjacent the center of said housing have cross sectional contours which are substantially flat.

7. Supporting means for disc-type harrows, as set forth in claim 1, in which the lower substantially semi-cylindrical portion of said housing has the groove at the end thereof terminating in substantially flat internal lips while the coacting grooves in the upper portion of the housing have cross sections that are internally substantially semi-circular.

8. Supporting means for disc-type harrows, as set forth in claim 1, in which the end grooves in the upper substantially semi-cylindrical portion of said housing terminate in interior faces which are substantially semi-circular in cross sectional contour and wherein the coacting end grooves in the lower substantially semi-cylindrical portion of said housing terminate in lips which project outwardly approximately five degrees from the limits of a cylindrical surface passing through the transverse centers of said end grooves.

References Cited in the file of this patent

UNITED STATES PATENTS

| | | |
|---|---|---|
| 1,885,410 | Brenneis | Nov. 1, 1932 |
| 1,971,547 | White | Aug. 28, 1934 |
| 2,076,693 | Altgelt et al. | Apr. 13, 1937 |
| 2,421,306 | White | May 27, 1947 |